United States Patent [19]

Roseberry

[11] 4,172,413
[45] Oct. 30, 1979

[54] BEVERAGE PREPARING APPARATUS

[76] Inventor: Homer R. Roseberry, R.R. #6, Columbia City, Ind. 46725

[21] Appl. No.: 921,500

[22] Filed: Jul. 3, 1978

[51] Int. Cl.$^2$ .......................................... A47J 31/42
[52] U.S. Cl. ........................................ 99/282; 99/286
[58] Field of Search ............... 99/289 R, 286, 290, 99/295, 304, 280, 281, 282, 283

[56] References Cited
U.S. PATENT DOCUMENTS

| | | | |
|---|---|---|---|
| 2,517,073 | 8/1950 | Alvarez | 99/289 |
| 3,038,492 | 6/1962 | Suggs | 99/286 |
| 3,084,613 | 4/1963 | Maxson | 99/289 |
| 3,107,600 | 10/1963 | Buisson | 99/286 |
| 3,327,615 | 6/1967 | Swan | 99/286 |
| 3,967,546 | 7/1976 | Cailliot | 99/286 |

Primary Examiner—Robert W. Jenkins
Attorney, Agent, or Firm—Gust, Irish, Jeffers & Rickert

[57] ABSTRACT

A hopper is positioned for receiving a beverage ingredient, such as coffee beans, and has a discharge opening in communication with a grinder input for receiving and grinding the coffee beans. A grinder motor is coupled to a power source through a manually adjustable timer having a rotatable knob manually settable to calibrations corresponding to the quantity of beverage to be prepared. The grinder thus produces a precise amount of beverage ingredient in particulate form after which it is introduced to a heated liquid, such as water, to prepare the beverage. Thermostat controls are used to regulate the temperature of and valve for the heated liquid.

6 Claims, 5 Drawing Figures

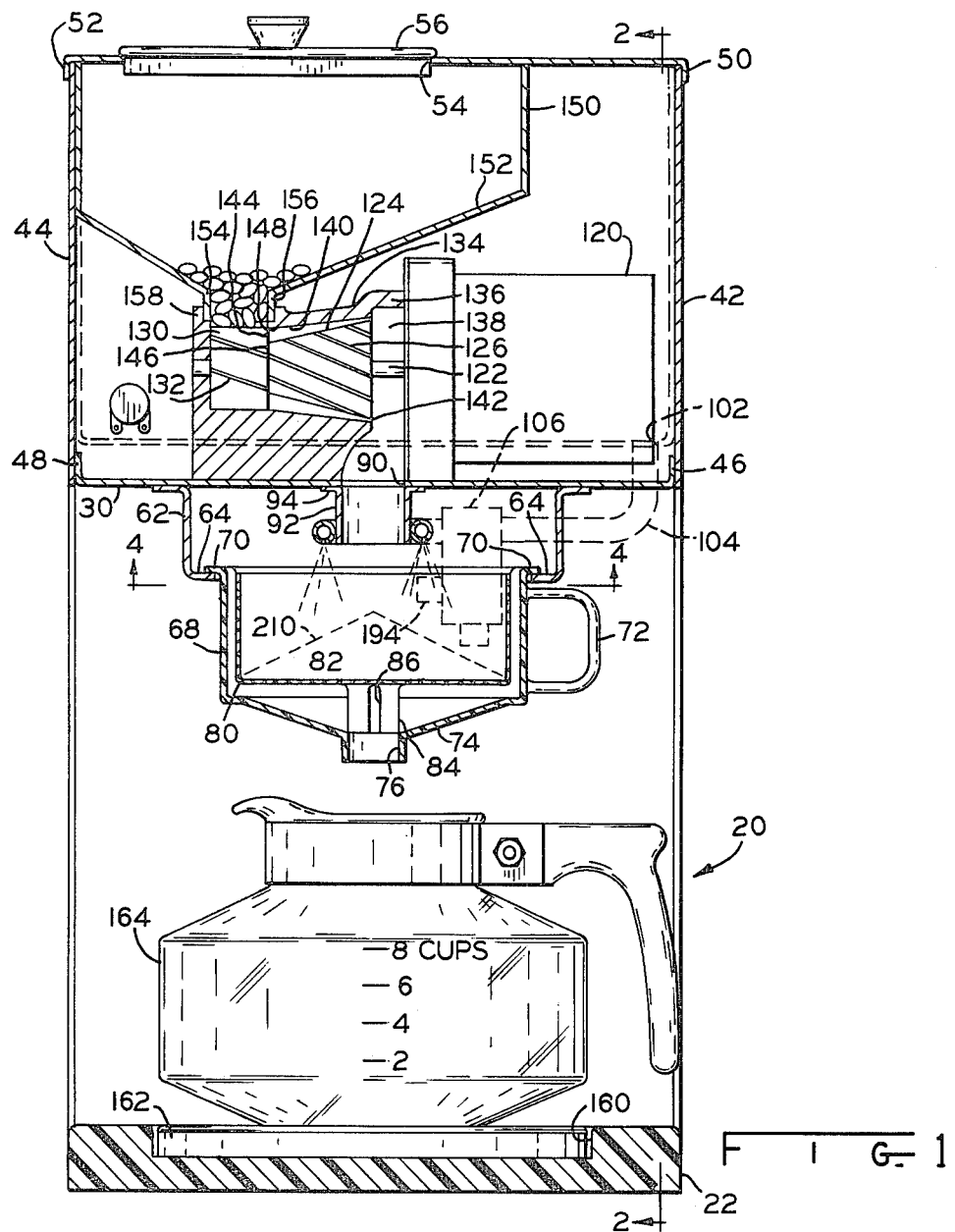
FIG. 1
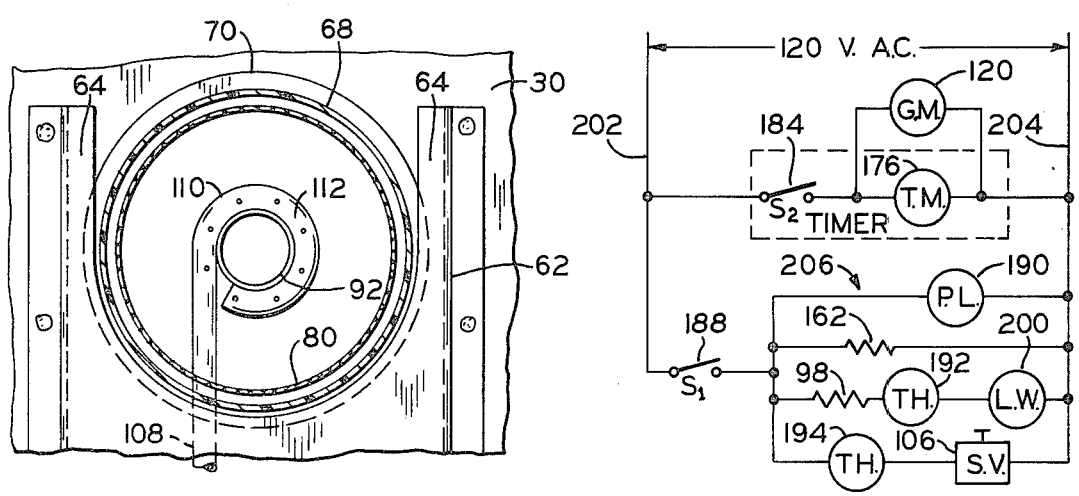
FIG. 4
FIG. 5

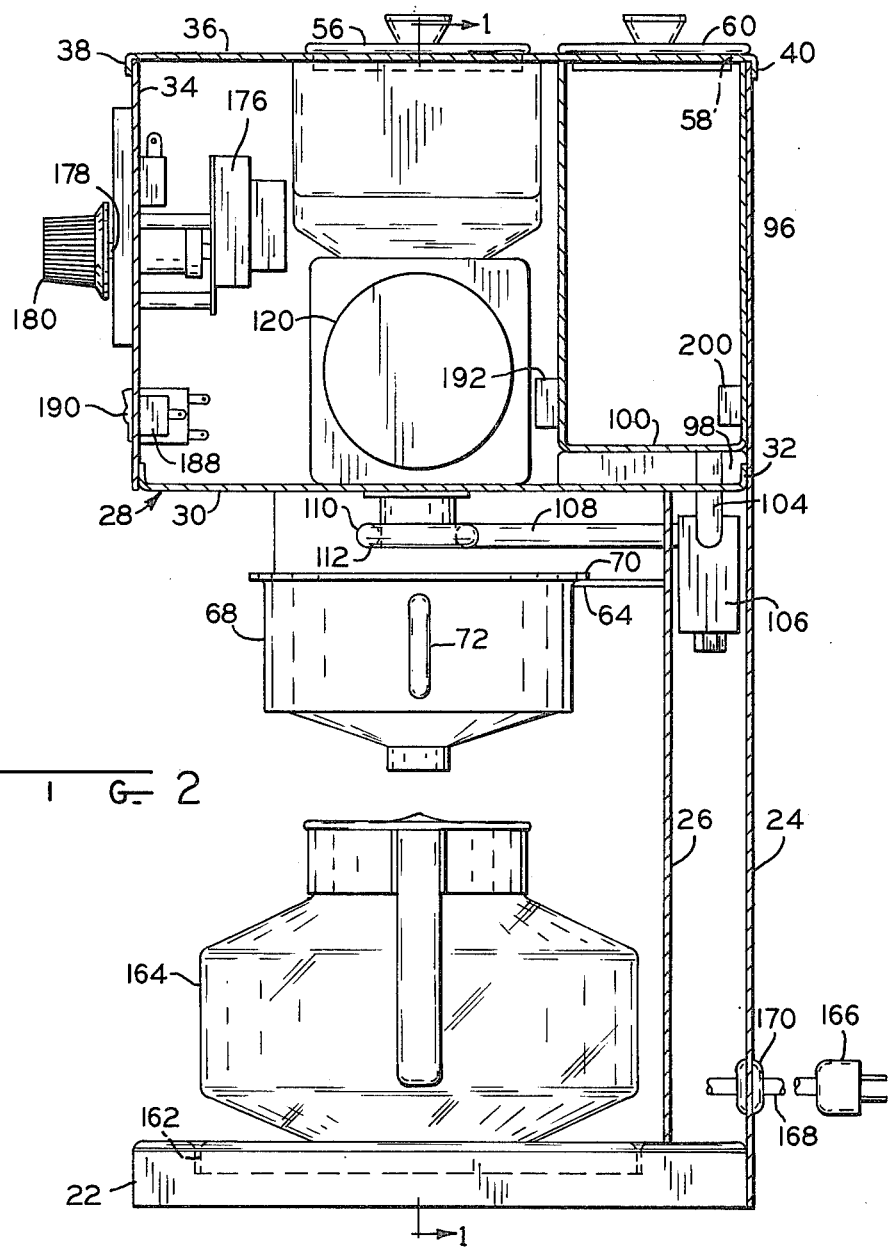
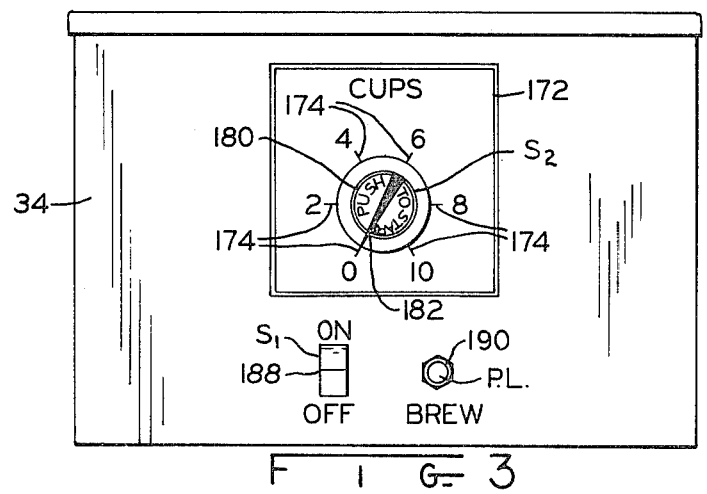

BEVERAGE PREPARING APPARATUS

BACKGROUND OF THE INVENTION

1. Field of the Invention

This invention is in the field of beverage preparing apparatus and more particularly to apparatus which processes a beverage ingredient such as coffee beans into particulate form just prior to beverage preparation.

2. Description of the Prior Art

Numerous devices are available for beverage preparation wherein a beverage ingredient, such as coffee beans, is prepared by grinding into particulate form just prior to the combination with a heated liquid, such as water, to prepare a beverage. The advantage in grinding the coffee beans immediately prior to their use and beverage preparation is to prevent flavor loss which would otherwise occur if the ground beans were exposed to the ambient air for any length of time prior to beverage preparation. Such devices are exemplified by those disclosed in the following U.S. Pat. Nos.: 3,327,615; 3,107,600; 3,038,492; 2,517,073; 3,967,546; 4,007,675. While these devices are capable of grinding predetermined quantities for various uses such as in commercial coffee machines or continuous coffee making operations, devices for providing manually adjustable predetermined quantities have been desired. Therefore, in those instances, especially for home use, where a particular quantity of beverage is desired for preparation from a quantity of coffee beans stored in a hopper, for a predetermined number of cups of coffee for consumption immediately after preparation, a need has existed.

SUMMARY OF THE INVENTION

A hopper is provided having a funnel-shaped discharge opening at the lower end thereof in communication with an auger-conveyor which is coaxial with and rotatable with a conically-shaped grinder having a plurality of grinding blades. A grinder motor rotates the auger-conveyor and the grinder for grinding the coffee beans to particulate form. The grinder motor is coupled to a power source through a manually adjustable timer having a manually rotatable knob with an index thereon settable to gradations corresponding to the quantity of beverage to be prepared. Once the knob index has been set to the desired gradation, the knob is manually depressed to start the timer and the grinder motor will operate for a time period corresponding to the manual setting.

The ground particulate matter is deposited on a filter element, which may be replaceable, supported in a filter basket and a corresponding quantity of heated fluid is sprayed over the ground coffee for beverage preparation. The coffee beverage thus prepared is directed to a container which is situated on a warmer plate. The temperature of the heated fluid is thermostatically controlled with the heating element in the liquid container being automatically energized from a power source when the liquid temperature is below a first temperature level such as 198° F., and de-energized when the liquid temperature is approximately 12° F. above that temperature level.

A thermostatically controlled solenoid valve is situated between the liquid tank and the spray orifices and the valve is opened when the liquid temperature is above a second temperature level, such as 200° F., and closed when the temperature is approximately 12° F. below that level, thus insuring the proper liquid temperature prior to spraying of the liquid over the coffee grounds.

Also, a low water sensor in the liquid tank is provided to inactivate the tank heating element when the water is below a predetermined level.

It is therefore an object of this invention to provide a beverage preparation apparatus wherein a manually selectable amount of beverage ingredient may be ground just prior to beverage preparation.

Another object of this invention is to provide in an apparatus of the previous object a liquid tank for use in beverage preparation having thermostatic controls for regulating the liquid temperature in the tank and for releasing the liquid from the tank.

It is a further object of this invention to provide in the apparatus of the previous objects a beverage ingredient selector which is calibrated in cups of beverage to be prepared, which selector regulates the time periods which an ingredient grinder is operative.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a partially sectioned view of a preferred embodiment of this invention taken at 1—1 of FIG. 2;

FIG. 2 is a partially sectioned view taken at 2—2 of FIG. 1;

FIG. 3 is a front elevational view of the control panel of the preferred embodiment;

FIG. 4 is a view taken at 4—4 in FIG. 1; and

FIG. 5 is a schematic diagram of the control system of this invention.

DESCRIPTION OF THE PREFERRED EMBODIMENT

Referring to the drawings, and in particular FIGS. 1 & 2, a beverage preparing apparatus 20 has base 22, made of a temperature and electrical insulative material, such as plastic, from which vertically extends and is supported at the rear edge thereof spaced walls 24, 26. A housing 28 has a bottom 30 supported on the upper end of wall 26 and affixed as by affixing upturned lip 32 to wall 24. Housing 28 has a front wall 34 forwardly spaced, in a leftward direction as viewed in FIG. 2, from wall 24 and a top 36 having downturn edges 38, 40 fittable over and affixed to walls 34 and 24. Sides 42, 44 are affixed to upturned edges 46, 48 respectively of bottom 30 and top 36 has downturned edges 50, 52 fittable over and affixed to sides 42, 44 respectively. Top 36 has a circular opening 54 for receiving cover 56 and a circular opening 58 for receiving cover 60.

Depending from bottom 30 of housing 28 is a U-shaped holder 62 having an inwardly formed U-shaped ledge 64 at the lower periphery thereof and having an opening 66 for receiving a filter basket 68. Basket 68 has outwardly turned lip 70 along the upper periphery thereof for engaging in supported position ledge 64. Basket 68 has handle 72 and a funnel-shaped lower surface 74 with a circular discharge passage 76 at the lower funnel end.

A cup-shaped filter 80 has depending from its lower perforated surface 82 a cylinder 84, with a plurality of vertical longitudinal slots 86 formed therein. The lower periphery of cylinder 84 is supported on the upper peripheral edge of passage 76. Bottom 30 has a central circular opening 90 and a cylindrical port 92 has an upper peripherial flange 94 affixed to bottom 30 so that the opening in cylinder 92 is in registration with opening 90.

A water tank 96 is supported against the wall 24 and has positioned therebeneath a heating element 98 which is in heating contact with the bottom 100 of tank 96. Tank 96 has an opening 102 in the bottom 100 to which is connected to one end of tube 104, the other end of which is in fluid communication with solenoid valve 106. A tube 108 has one end in fluid communication with valve 106 and the other end in fluid communication with annulus 110 which is fitted about the lower end of cylinder 92 and has in its lower surface a plurality of equally spaced liquid spray openings 112.

Mounted in housing 28 is a gear motor 120 having output shaft 122 which turns at 100 to 200 r.p.m. Affixed to and rotated by shaft 122 is a conical grinder cone 124 having four grinding blades 126 helically mounted thereon. Affixed to the end of cone 124 and rotated therewith is an auger conveyor 130 having a plurality of spiral conveying blades 132 mounted thereon.

A manifold 134 is provided at one end with a U-shaped rim 136 which defines an opening 138. Communicating with manifold 136 is a conically shaped passage 140, the walls of which diverge at a smaller angle than the angle of cone 124, for reasons which will become apparent. A small peripheral annular clearance 142 is provided between the periphery of the base of cone 124 and one end of passage 140. A substantially larger annular peripheral space 144 is between the smaller end 146 of cone 124 and the opening at end 148 of passage 140.

A coffee bean hopper 150 is affixed to and depends from top 36 and has a funnel-shaped bottom 152 with an opening 154 at the lower end thereof from which depends a discharge sleeve 156 which is supported in collar 158 of manifold 134.

Stand 22 has a shallow cylindrical cavity 160 formed centrally therein into which is placed in supported relation a warmer plate 162 having electrical heating coils, not shown but conventional in the art. A coffee pot 164, in this embodiment having a capacity of eight cups, of conventional construction and design is placed on burner 162 beneath spout 76 in beverage receiving relation. A plug 166 adapted to be inserted in a conventional power outlet of 120 volts AC has a cord 168 which passes through and is supported by rubber grommet 170 attached in an opening in wall 24.

Referring now to FIG. 3, panel side 34 has attached to the outer wall thereof and escutcheon 172 attached to the outer wall thereof which has a plurality of gradations 174 marked thereon which correspond to the number of cups of beverage to be prepared. A timer motor 176 is firmly attached to the inner wall of side 34 and a motor shaft 178 extends through openings in wall 34 and plate 172 and has knob 180 removably attached thereto. Knob 180 has index 182 marked thereon and knob 180 is manually rotatable to place index 182 opposite a desired gradation 174 after which knob 180 may be depressed, depressing shaft 178 to start timer motor 176 to return index 182 to the "0" gradation 174 at a predetermined rate. During timer motor operation, a switch 184, FIG. 5, is closed and after index 182 reaches the "0" gradation 174, switch 184 automatically opens.

Timer motor 176 is commercially available and one source is the Bristol Saybrook Company, 500 Coulter Avenue, Old Saybrook, Conn., 06475 having designation Timer No. 5720.

An "on-off" switch 188 is mounted to side 34 and is a standard switch such as is available from Stackpole Components Company, Post Office Box 14466, Raleigh, N.C., 27610, having the designation Switch No. RS-26. Also, pilot light 190 is mounted adjacent switch 182 and is illuminated when switch 188 is in the "on" position.

A thermostat switch 192 is attached to the lower portion of a wall of tank 96 for sensing the water temperature in tank 96. Thermostat switch 192 is a normally closed thermostat which opens when the water temperature reaches 210° F. and closes when the water temperature lowers to 198° F. A thermostat switch 194 for controlling solenoid valve 106 is attached to sense the water temperature in tube 108 and is normally open but snaps closed when the water temperature reaches 200° F. and opens when the water reaches a temperature of 188° F. Thermostat switches 192, 194 are of conventional design and commercially available such as from Elmwood Sensors Inc., 1653 Elmwood Avenue, Cranston, R.I., 02907, and have designation Thermostat No. 3001. A low water switch 200 is attached to a lower wall in tank 96 and opens when water level is below switch 200 to de-energize heating element 98 as will become apparent in the following discussion of the schematic diagram in FIG. 5.

Referring now to FIG. 5, a 120 volt AC power source is coupled across lines 202, 204 when plug 166 is inserted into the conventional power outlet. Switch 184 is coupled in series with timer motor 176 between lines 202, 204 and grinder motor 120 is coupled in parallel across motor 176. Switch 188 is coupled in series with parallel circuit 206. Pilot light 190 is in one leg of circuit 206, heating element 162 is in a second leg of circuit 106, heating element 98, thermostat 192, and low water switch 200 are connected in series in a third leg of circuit 206, and thermostat 194 and valve 106 are connected in series in a fourth leg of circuit 206.

In operation of the embodiment shown, hopper 150 is filled with a beverage ingredient such as coffee beans. When it is desired to prepare a beverage, knob 180 is manually rotated in a clockwise direction until index 182 registers with a gradation 184 corresponding to the quantity of beverage to be prepared. Assuming that six cups of beverage are to be prepared, index 182 is aligned with the gradation "6" and knob 180 is depressed closing switch 184 actuating grinder motor 120 and timer motor 176 for a period of time corresponding to that time period required for index 182 to move in a counterclockwise direction back to gradation "0".

During the operation of grinder motor 120, shaft 122 is rotated causing auger 130 to rotate conveying beans from the bottom portion of hopper 150 into the annular opening between cone 126 and passage 140, which opening gradually decreases in dimension resulting in an increasingly finer grinding of the coffee beans as the coffee beans move rightwardly along cone 124, as viewed in FIG. 1, under the pressure of bean feed by auger conveyor 130. The beans exit from the annular opening 142 into chamber 138 of manifold 136 with the fineness of the ground particulate being controlled by the radial dimension of opening 142. The fineness of grind can be controlled by selecting a cone 124 having the desired diameter at its base to provide a correspondingly dimensioned opening 142. The ground particulate passes through chamber 138 and through discharge port 92 into filter 80 wherein it accumulates in a conical mound 210 and in an amount corresponding to the manual setting of index 182 of switch 180.

Liquid, such as water, is placed in tank 96 in an amount corresponding to the desired number of beverage cups to be prepared, and in the foregoing illustration, sufficient liquid would be placed in tank 96 to prepare six cups before the low water mark of switch 200 is reached. Switch 188 is manually closed causing power to be placed across tank heating element 198 which will be energized until thermostat switch 192 opens which in the preferred embodiment is approximately 210° F. Switch 200 is closed since the water level is above that which is a minimum level for the tank.

Normally open thermostat switch 194 will close when the water temperature in tube 108 reaches 200° F. and will remain closed until the water temperature falls to 188° F. Solenoid valve 106 is thus actuated to open providing a liquid path from tank 96 to spray ring 110 from which heated water will be sprayed from perforations 112 onto mound 210 to prepare a coffee beverage in the usual manner which is collected in pot 164.

Thus, a large quantity of coffee beans may be stored in hopper 150 and ground as required in the precise amount needed for the immediate need of beverage consumption. Since the coffee in bean form retains its freshness, and since the ground beans are immediately used, superior coffee flavor is obtainable. Further, there is no coffee wastage since the precise amount needed can be provided by the proper manual positioning of knob 180 opposite the desired gradation 174.

While there have been described above the principles of this invention in connection with specific apparatus, it is to be clearly understood that this description is made only by way of example and not as a limitation to the scope of the invention.

What is claimed is:

1. Beverage preparing apparatus comprising:
    a hopper for receiving a coarse beverage ingredient; said hopper having an enlarged receiving opening and a funneled discharge opening;
    a grinder having an input in direct receiving relation to said discharge opening and a discharge port for discharging the ingredient ground to particulate form;
    a liquid heating station having a discharge spout for discharging heated liquid;
    a beverage preparing station in liquid receiving relation to said spout and in ground ingredient receiving relation to said discharge port and discharge spout and having a discharge passage;
    beverage retaining container in receiving relation to said discharge passage;
    first means associated with said grinder for grinding a manually adjustable quantity of ingredient; said quantity being related to the amount of beverage to be prepared.

2. The apparatus of claim 1 including second means for thermostatically sensing the liquid temperature and for controlling the heating of the liquid in said liquid heating station and for restricting the discharge of liquid from said spout unless said liquid temperature is above a predetermined minimum temperature.

3. The apparatus of claim 2 wherein said second means comprises a liquid tank and a heating element positioned adjacent said tank to heat the water in said tank;
    a first thermostat switch positioned for sensing the liquid temperature in said tank and for deactuating said heating element when said liquid temperature is above a first temperature range and for actuating said heating element when the liquid temperature is below said first range;
    a solenoid valve having open and closed positions for controlling liquid discharge from said tank through said spout to said beverage preparing station;
    a second thermostat switch positioned in liquid temperature sensing relation to the liquid received by said beverage preparing station for actuating said solenoid to an open position when the liquid temperature is above a second temperature range and closing said valve when said temperature is below said second range;
    said second temperature range being below said first temperature range.

4. The apparatus of claim 1 wherein said first means comprises a manually adjustable timer calibrated in time period gradations and operable for time periods corresponding to the gradation setting, said gradations corresponding to quantities of beverage to be prepared; said grinder being responsive to said timer periods of operation and operative only during said periods.

5. The apparatus of claim 4 wherein said timer further comprises a rotatably mounted knob that is manually rotatable to select a gradation and manually depressible after a gradation selection to set the timer in operation.

6. The apparatus of claim 1 wherein said grinder comprises a first section having a plurality of spiral auger conveyor blades in communication with said discharge opening; said grinder having a second section having a tapered cone with a plurality of grinding blades, said cone being in ingredient receiving relation to said auger conveyor.

* * * * *